(12) United States Patent
Mundus et al.

(10) Patent No.: US 12,062,128 B2
(45) Date of Patent: Aug. 13, 2024

(54) METHOD AND SYSTEM FOR SIMULATING TEXTURE FEATURES OF A COATING

(71) Applicant: BASF Coatings GmbH, Münster (DE)

(72) Inventors: Markus Mundus, Münster (DE); Thomas Kantimm, Münster (DE)

(73) Assignee: BASF COATINGS GMBH, Muenster (DE)

( * ) Notice: Subject to any disclaimer, the term of this patent is extended or adjusted under 35 U.S.C. 154(b) by 204 days.

(21) Appl. No.: 17/628,063

(22) PCT Filed: Jul. 13, 2020

(86) PCT No.: PCT/EP2020/069803
§ 371 (c)(1),
(2) Date: Jan. 18, 2022

(87) PCT Pub. No.: WO2021/013615
PCT Pub. Date: Jan. 28, 2021

(65) Prior Publication Data
US 2022/0277509 A1    Sep. 1, 2022

(30) Foreign Application Priority Data

Jul. 19, 2019 (EP) ..................... 19187275

(51) Int. Cl.
*G06T 15/06* (2011.01)
*G06T 7/40* (2017.01)
(Continued)

(52) U.S. Cl.
CPC ............... *G06T 15/04* (2013.01); *G06T 7/40* (2013.01); *G06T 15/06* (2013.01); *G06T 15/506* (2013.01);
(Continued)

(58) Field of Classification Search
CPC ............................. G06T 15/06; G06T 3/4053
See application file for complete search history.

(56) References Cited

U.S. PATENT DOCUMENTS 8,345,252 B2 * 1/2013 Nisper ................. G01N 21/251
356/402
9,483,814 B1 * 11/2016 Harper .................... G06F 21/10
(Continued)

FOREIGN PATENT DOCUMENTS

| JP | H08221560 A | 8/1996 |
|----|-------------|--------|
| JP | H10247256 A | 9/1998 |

OTHER PUBLICATIONS

Jafolla et al. ("Phenomenological BRDF Modeling for Engineering Applications", 1997) (Year: 1997).*
(Continued)

*Primary Examiner* — Phong X Nguyen
(74) *Attorney, Agent, or Firm* — Armstrong Teasdale LLP (57) ABSTRACT

Described herein is a computer-implemented method for simulating texture features of a n-layer target coating, the method including at least the steps of: a) providing known real geometrical properties and known individual ingredients with known real material properties; b) modelling the n-layer target coating in a virtual environment; c) virtually tracing rays of light from one or more light sources towards an aim region defined on a surface of the n-layer target coating; d) virtually collecting rays of light that interacted with the n-layer target coating; e) virtually determining, at least one of an angular, a spectral and a spatial distribution of intensity of the rays of light re-emitted from or reflected by the n-layer target coating; and f) evaluating the determined distribution(s) of intensity and outputting, by an output device, at least one image based on the evaluation.

14 Claims, 3 Drawing Sheets

(51) Int. Cl.
*G06T 15/04* (2011.01)
*G06T 15/50* (2011.01)

(52) U.S. Cl.
CPC ............... *G06T 2207/10024* (2013.01); *G06T 2215/16* (2013.01)

(56) References Cited

U.S. PATENT DOCUMENTS

| | | | | |
|---|---|---|---|---|
| 11,782,762 B2* | 10/2023 | Senior | ................... | G06F 9/4806 |
| | | | | 718/104 |
| 2002/0113195 A1* | 8/2002 | Osada | ................... | G06T 3/4007 |
| | | | | 348/E9.01 |
| 2004/0109009 A1* | 6/2004 | Yonezawa | ............. | G06T 19/006 |
| | | | | 345/632 |
| 2007/0002056 A1* | 1/2007 | Chen | ........................ | G06F 30/20 |
| | | | | 345/473 |
| 2010/0049484 A1 | 2/2010 | Berlin et al. | | |
| 2010/0054578 A1* | 3/2010 | Ekpar | ........................ | G06T 1/60 |
| | | | | 382/154 |
| 2010/0219345 A1* | 9/2010 | Franch | .................. | G01T 1/1642 |
| | | | | 250/362 |
| 2014/0186633 A1* | 7/2014 | Henry | ..................... | G01J 3/463 |
| | | | | 427/256 |
| 2016/0371880 A1* | 12/2016 | Ide | ........................... | G06F 30/20 |
| 2020/0309917 A1* | 10/2020 | Kudla | ..................... | G01S 17/04 |
| 2022/0277509 A1* | 9/2022 | Mundus | ..................... | G06T 7/40 |
| 2023/0298255 A1* | 9/2023 | Benthin | .................. | G06T 15/06 |
| | | | | 345/426 |
| 2023/0316633 A1* | 10/2023 | Wu | ......................... | G06T 15/50 |
| | | | | 345/426 |
| 2024/0082764 A1* | 3/2024 | Fujimoto | ........... | G01N 33/0011 |

OTHER PUBLICATIONS

Gunther et al. ("Efficient Acquisition and Realistic Rendering of Car Paint", 2005) (Year: 2005).*
Filip et al. ("Template-Based Sampling of Anisotropic BRDFs", 2014) (Year: 2014).*
Wald et al., Applying Ray Tracing for Virtual Reality and Industrial Design, 2006 (Year: 2006).*
Rump et al., Photo-realistic Rendering of Metallic Car Paint from Image-Based Measurements, 2008 (Year: 2008).*
Guarnera et al., Material Capture and Representation with Applications in Virtual Reality, 2017 (Year: 2017).*
Belcour, Efficient Rendering of Layered Materials using an Atomic Decomposition with Statistical Operators, 2018 (Year: 2018).*
Mammen et al., Transparency and Antialising Algorithms Implemented with the Virtual Pixel Maps, 1989 (Year: 1989).*
Lean, Virtual Pixels Printed with Acoustic Mist Imaging, 2002 (Year: 2002).*
Holzlöhner, Towards a Stray Light Analysis of the ELT, 2017 (Year: 2017).*
International Search Report and Written Opinion for corresponding PCT/EP2020/069803 mailed Dec. 7, 2020, 18 Pages.
Gondek et al., "Wavelength dependent reflectance functions." In Proceedings of the 21st annual conference on Computer graphics and interactive techniques, pp. 213-220 (1994).

* cited by examiner

METHOD AND SYSTEM FOR SIMULATING TEXTURE FEATURES OF A COATING

CROSS-REFERENCE TO RELATED APPLICATIONS

This application is a U.S. National Phase Application of International Patent Application No. PCT/EP2020/069803, filed Jul. 13, 2020, which claims priority to European Patent Application No. 19187275.3, filed Jul. 19, 2019, the entire contents of which are hereby incorporated by reference herein.

The present disclosure refers to a method and a system for simulating texture features of a n-layer target coating. The present disclosure also refers to a respective computer-readable medium.

BACKGROUND

The appearance of a paint or coating depends on both, its color and its texture. Therefore, texture features like coarseness, sparkling area or sparkling intensity are used in colorimetry of paints and coatings for describing, matching and developing colors.

In automotive applications, for example, most paints or coatings consist of multi-layered materials, where each layer has a different purpose. The overall appearance of paints depends on the paint composition but also on the spatial distribution of particles, most often heterogeneous and multi-scale. Metal particles, for example, may produce specular reflection and sparkling effects. These effects depend on the chemical nature of the particles, the surface roughness of the particles and the dispersion of the particles within the coating and on clustering effects.

Generally, the texture features are determined from photographs of the coating under distinct direct or diffuse illumination conditions. In color matching these features are used to support finding the correct color by e.g. database searches. In color development statistical models are applied to predict texture features of new formulations. However, these models require huge amounts of physical training data and do not allow for simulating texture features e.g. from scratch or for entirely new layer configuration.

One application of computer graphics is virtual prototyping, i.e. designing a product completely digital and basing design decisions solely on computer-generated images of that virtual product.

Against this background, it was an object of the present disclosure to provide a possibility to simulate a paint coating basically digitally, i.e. without statistical training data, and to support digital color development.

SUMMARY OF THE INVENTION

The present disclosure provides a computer-implemented method for simulating texture features of a n-layer target coating, each layer of the n-layer target coating having known real geometrical properties and being composed of known individual ingredients with known real material properties, the method comprising at least the steps of:
  a) providing, via at least one communications interface, the known real geometrical properties and the known individual ingredients with the known real material properties,
  b) modelling, by at least one processor, the n-layer target coating in a virtual environment, wherein each layer of the n-layer target coating is created according to its real geometrical and material properties;
  c) virtually tracing, by at least one of the at least one processor, rays of light from one or more virtual light sources towards an aim region defined on a surface of the n-layer target coating for simulating an interaction of incident light rays from the one or more virtual light sources and the n-layer target coating;
  d) virtually collecting, by one or more receivers, rays of light that interacted with the n-layer target coating;
  e) virtually determining (measuring), by the one or more receivers, at least one of an angular, a spectral and a spatial distribution of intensity of the rays of light re-emitted from or reflected by the n-layer target coating,
  f) evaluating, by at least one of the at least one processor, the determined distribution(s) of intensity and outputting, by an output device, at least one image based on the evaluation.

In the scope of the present disclosure, the term "receiver" describes a point or an area in the virtual environment that collects and stores information of rays of light passing through the receiver that are re-emitted or reflected by the coating. Such information of the rays of light can comprise spectral, amplitude, positional and/or angular information of the rays of light. In the virtual environment, the receiver can be represented as a two-dimensional unit which is positioned close over the target coating.

In the scope of the present disclosure, the terms "paint", "coating" and "paint coating" are used synonymously.

The term "n-layer target coating" comprises an one-layer target coating as well as a multi-layer target coating, i.e. n can be every natural number greater than or equal to 1.

According to the invention, texture features are directly determined from optical simulations. Thus, the invention does not require any statistical training data but only the real physical properties of individual ingredients of the formulation underlying the target coating. The optical simulation approach, i.e. the proposed method aims to support advanced digital color development.

Three main method steps might be distinguished in the proposed method. In a first step, corresponding to above mentioned steps a) and b), the coating (or layer stack) to be simulated, is created in a virtual environment. In a second step, corresponding to above mentioned method step c), ray-tracing is used to simulate the interaction of incident light (e.g. from a direct or diffuse virtual light source) and the created layer stack. The present disclosure is not limited to ray-optical simulations as wave optical processes like e.g. thin-film interference or scattering processes might complement the ray-tracing approach if applicable. In a third step, corresponding to above mentioned method steps d) to f), the rays re-emitted from (or reflected by) the layer stack/coating are evaluated by receivers in a spatially and/or spectrally resolved manner and post-processed to obtain texture feature values.

In an exemplary embodiment, in the modelling step, regarding the geometrical properties, modelling of the n-layer target coating in the lateral dimensions is restricted to a region interacting with the incident light rays in step c).

In a further exemplary embodiment, in the modelling step, regarding the geometrical properties, modelling of the n-layer target coating in the longitudinal dimension, i.e. with regard to thickness, is modelled with an exact value given by the known real geometrical properties.

In still a further embodiment, in the modelling step, regarding the material properties, the layer ingredients are described by their respective complex refractive index.

In the modelling step, each layer of the coating is created according to its geometrical and material properties. Regarding the geometrical properties, it might be enough to restrict modelling in the lateral dimensions (width and length of a sample provided with the target coating) to the region interacting with the incident rays in the second step. In contrast, the longitudinal dimension (thickness of the coating) needs to be modelled with the exact value, since thicknesses of layers affect ray-matter interaction significantly. The layer materials are described by their complex refractive index, respectively. Further, optical ray-matter interaction at interfaces of layer-layer boundaries, i. e. at layer interfaces might be set to specific and possibly even idealized optical properties like e.g. but not limited to absorption, Lambertian scattering, Fresnel reflection or transparency. In ray optics, interaction at layer interfaces is generally described by Fresnel equations. In these equations, reflection and transmission at an interface between two layers is calculated from the ray's angle of incidence as well as the complex refractive index of the layer materials of the two layers, respectively. Additionally, interface roughness might be modelled by (e.g. random) scattering properties of the respective surfaces which meet at said interface. In some cases, it might be advantageous to reduce physical complexity and, thus, computational effort assuming idealized interface properties like e.g. a perfect mirror that reflects incident rays to 100 percent in specular direction, a perfect absorber that perfectly absorbs all incident rays, or a perfect Lambertian that scatters incident rays statistically according to the Lambtian law.

In a further aspect, the modelling step comprises modelling pigments of at least one of color/black/white pigment type and flake pigment type. Herein the color/black/white pigments are described by volume scattering particles that are described by their size, their material, their material density, their volume or weight percentage with respect to a surrounding matrix material, their angular scattering distribution and their transmittance. These properties are e.g. obtained from Mie theory or from wave-optical simulations or from any other applicable numerical method or theory. For example, scattering by spherical nanoparticles made of e.g. silver or titanium dioxide can be accurately modelled by Mie theory. A ray penetrating into a bulk volume with such particles interacts with a specific particle after a certain distance that is described by the free mean path that results from the amount of such pigments dispersed in the bulk material. Upon interaction with said specific particle, the ray (or a portion of it) is statistically scattered into a new angular direction according to the angular scattering distribution of said particle. Another portion of the ray might be absorbed or transmitted without change of direction. The particles in the bulk can be of homogeneous size or have some size distribution. The model assumes homogeneously dispersed pigments in the bulk. The flake-type pigments are modelled by single surfaces of various geometries and orientations with respect to the surface normal that are immersed into a specific layer. Herein, interface properties like but not limited to bi-directional reflectance distribution functions (BRDF), thin-film-coatings, Fresnel interaction, perfect mirror, perfect absorber or perfect transmittance can be attributed to the surface. For example, ray interaction with mica flakes coated by metal oxides is modelled by thin-film-interference whereas interaction with aluminium flakes might be approximated by specular reflection or a BRDF with some angular reflectance cone around specular direction.

Further, the modelling step comprises flake-type pigments additionally being set to specific lateral/longitudinal, alignment, thickness and/or optical property distributions.

Thus, the modelling step might involve modelling pigments of two different types: 1) color or black/white pigments and 2) flake-type pigments. Color/black/white pigments can be described by volume scattering particles obeying Mie scattering or other user-defined scattering properties that can be obtained e.g. from prior wave-optical simulations. Flake-type pigments, such as aluminums, micas etc., can be modelled by geometrical components of various geometries that are immersed into a specific layer. Afterwards, the interface properties of these immersed geometrical components are set to the desired spectral optical property of the flake-type pigment, e.g. thin-film interference, mirrors of different smoothness, specific bi-directional scattering distributions. Whereas the optical properties, concentration and size of each pigment type can be modelled, flake-type pigments can additionally be set to specific lateral and/or longitudinal alignment, thickness and optical property distributions (e.g. varying film-thickness distribution).

In the ray-tracing step, rays are traced from one or more virtual light sources towards an aim region defined in/on the coating surface. The rays may be modelled as obeying pre-given spectral, angular and/or spatial distributions. Thus, the at least one light source may be a direct or diffuse light source with, for example, D65 spectral distribution. D65 designates a commonly used standard illuminant defined by the International Commission on Illumination. The illuminant defines the spectral distribution.

In the third step, the rays that interacted with the coating are collected by one or more receivers. These receivers can measure/determine the angular, spectral and/or spatial intensity distribution of the rays re-emitted from (or reflected by) the coating.

According to one embodiment of the proposed method, in step e) for texture analysis, the angular and/or spatial distribution of intensity of the light rays is evaluated and at least one gray-scale image is obtained.

In another application, this information can be received in a spectrally resolved manner as well (e.g. to obtain colored images or, more generally, to obtain spectral information about the spatial reflectance of the coating). That means that in step e) for texture analysis, spectral distribution of intensity of the light rays is determined and at least one colored image is obtained.

It is advantageous to choose virtual pixel sizes of the at least one image to obtain micrometer-scale resolution, i. e. μm-scale resolution. This allows for distinguishing bright spots caused by flake-type pigments and a (darker) background unambiguously.

According to one further aspect, the proposed method further comprises the step of post-processing the at least one image by means of a known post-processing method to deduce the texture features. In analogy to measured images of real samples, these simulated images from virtual coatings can be post-processed by different methods known from the art to deduce texture features. For example, texture of gray-scale images can statistically be described by nearest-neighbor gray-tone spatial-dependence matrices (Haralick et al., IEEE Transactions on Systems, Man, and Cybernetics 3(6), 1973) or by autocorrelation methods (e.g. Kaizer et al., Boston University Research Laboratories, Boston University, Boston, MA, Tech. Note 121, 1955), by geometrical methods that extracts texture (features) from geometrical properties of texture elements, or by others. A review of different texture analysis approaches is e.g. given in *The Handbook of Pattern Recognition and Computer Vision* (Chapter 2.1, Texture Analysis, written by Mihran Tuceryan and Anil K. Jain).

The present disclosure further refers to a system for simulating texture features of a n-layer target coating, each layer of the n-layer target coating having known real geometrical properties and being composed of known individual ingredients with known real material properties, the system comprising:
A) at least one computing device;
B) a computer program product, the computer program product comprises computer executable codes stored on a computer readable storage medium functionally coupled to the at least one computing device and causes the at least one computing device to perform a computing process when in operation, the computing process comprises the steps of:
B1) receiving, via at least one communications interface, the known real geometrical properties and the known individual ingredients with the known real material properties,
B2) modelling the n-layer target coating in a virtual environment, wherein each layer of the n-layer target coating is created according to its real geometrical and material properties;
B3) virtually tracing rays of light from one or more virtual light sources towards an aim region defined on a surface of the n-layer target coating for simulating an interaction of incident light rays from the one or more virtual light sources and the n-layer target coating;
B4) virtually collecting rays of light that interacted with the n-layer target coating;
B5) virtually determining (measuring) at least one of an angular, a spectral and a spatial distribution of intensity of the rays of light re-emitted from or reflected by the n-layer target coating,
B6) evaluating the determined distribution(s) of intensity and outputting, via an output device, at least one image based on the evaluation.

According to one possible embodiment of the proposed system, the system further comprises:
C) a color database comprising individual ingredients with their material properties and formulations for coating compositions and interrelated colorimetric data;
wherein the computing device is functionally coupled to the color database.

The known real material properties of the known individual ingredients may be received from the color database.

The computing device may further comprise an input device and the output device. The computing device is at least functionally coupled to an input device and the output device via suitable communication connections.

The computing device may include or may be in communication with one or more input units, such as a touch screen, an audio input, a movement input, a mouse, a keypad input and/or the like. Further the computing device may include or may be in communication with one or more output devices, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the computing device described herein and related components may be a portion of a local computer system or a remote computer or an online system or a combination thereof. The database and software described herein may be stored in computer internal memory or in a non-transitory computer readable medium.

All components of the proposed system are in communicative connection with each other, i.e. they are networked with each other. Such communicative connection may be a direct connection or an indirect connection. Each communicative connection may be a wired or a wireless connection. Each suitable communication technology may be used. The different components of the system, such as the computing device and the database, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The present disclosure further refers to a computer program product for simulating texture features of a n-layer target coating, each layer of the n-layer target coating having known real geometrical properties and being composed of known individual ingredients with known real material properties, the computer program product comprises computer executable codes stored on a computer-readable storage medium functionally coupled to at least one computing device and causes the at least one computing device to perform a computing process when in operation, the computing process comprises the steps of:
1) receiving, via at least one communications interface, the known real geometrical properties and the known individual ingredients with the known real material properties,
2) modelling the n-layer target coating in a virtual environment, wherein each layer of the n-layer target coating is created according to its real geometrical and material properties;
3) virtually tracing rays of light from one or more virtual light sources towards an aim region defined on a surface of the n-layer target coating for simulating an interaction of incident light rays from the one or more virtual light sources and the n-layer target coating;
4) virtually collecting rays of light that interacted with the n-layer target coating;
5) virtually determining (measuring) at least one of an angular, a spectral and a spatial distribution of intensity of the rays of light re-emitted from or reflected by the n-layer target coating,
6) evaluating the determined distribution(s) of intensity and outputting, via an output device, at least one image based on the evaluation.

Further, a non-transitory computer-readable medium for simulating texture features of a n-layer target coating is provided, each layer of the n-layer target coating having known real geometrical properties and being composed of known individual ingredients with known real material properties, the computer-readable medium storing instructions that when executed by one or more processors, cause a machine to:

1) receive, via at least one communications interface, the known real geometrical properties and the known individual ingredients with the known real material properties,
2) model the n-layer target coating in a virtual environment, wherein each layer of the n-layer target coating is created according to its real geometrical and material properties;
3) virtually trace rays of light from one or more virtual light sources towards an aim region defined on a surface of the n-layer target coating for simulating an interaction of incident light rays from the one or more virtual light sources and the n-layer target coating;
4) virtually collect rays of light that interacted with the n-layer target coating;
5) virtually determine (measure) at least one of an angular, a spectral and a spatial distribution of intensity of the rays of light re-emitted from or reflected by the n-layer target coating,
6) evaluate the determined distribution(s) of intensity and outputting, via an output device, at least one image based on the evaluation.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

DETAILED DESCRIPTION

Figures 1, 2:
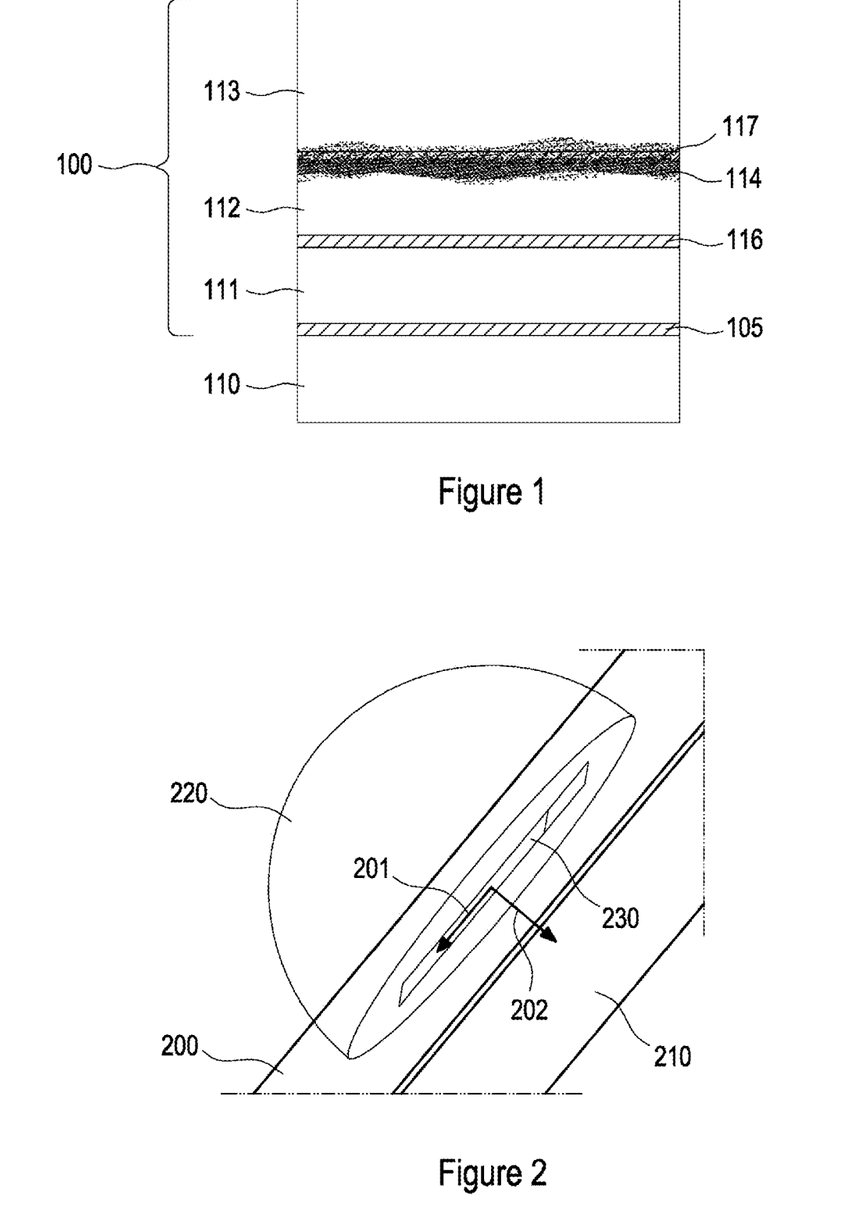
FIG. 1 shows a schematic sectional view at a virtually created coating according to one embodiment of the proposed method.
FIG. 2 shows an angled view from above at a schematically illustrated further virtually created coating virtually illuminated by a diffuse light source according to a further embodiment of the proposed method.

FIG. 1 shows a cross-section of an example of a n-layer target coating 100, i.e. a layer stack which has been created according to an embodiment of the proposed method. The n-layer target coating 100 shown here is a 3-layer coating, i.e. three layers, i.e. three coats are provided on top of a substrate 110. Each layer has known real geometrical properties and is composed of known individual ingredients with known real material properties. The 3-layer target coating is modelled, by at least one processor, in a virtual environment, wherein each layer of the 3-layer target coating is created according to its real geometrical and material properties. In the modelling step, regarding the geometrical properties, modelling of the 3-layer target coating in the lateral dimensions may be restricted to a region interacting with incident light rays in the subsequent ray-tracing step.

The 3-layer target coating is provided on top of the substrate 110. Directly on top of the substrate 110 is a first coat (a first layer) 111 without flake-type pigments, but with color and/or white/black pigments. On top of the first coat 111, a second coat (a second layer) 112 with immersed flake-type pigments 114 of varying size, position and orientation is provided. On top of the second coat 112, a clear coat as a third coat (a third layer) 113 is provided. The clear coat 113 comprises no flake-type pigments. Interfaces 116 and 117 between adjacent layers and an interface 105 between the substrate 110 and the first layer 111 are highlighted by darker overlap regions. The interfaces ensure that adjacent layers are in optical contact in the simulations, i. e. there is no air gap between the adjacent layers.

In the modelling step, regarding the geometrical properties, modelling of the 3-layer target coating in the longitudinal dimension (thickness) may be modelled with an exact value given by the known real geometrical properties.

Regarding the material properties, the layer ingredients are described by their respective complex refractive index. Those material properties may be provided or retrieved from a color database.

In the modelling step, each layer 111, 112, 113 of the coating is created according to its geometrical and material properties. Regarding the geometrical properties, it might be enough to restrict modelling in the lateral dimensions (width and length of a sample provided with the target coating 100) to the region interacting with the incident rays in the subsequent ray-tracing step. In contrast, the longitudinal dimension (thickness of the coating 100) needs to be modelled with the exact value, since thicknesses of layers 111, 112, 113 affect ray-matter interaction significantly. The layer materials are described be their complex refractive index, respectively. Further, optical ray-matter interaction at interfaces 116 and 117 of layer-layer boundaries might be set to specific optical properties like e.g. but not limited to absorption, Lambertian scattering, Fresnel reflection, scattering according to an arbitrary scattering distribution function or transparency.

The modelling step might involve modelling pigments of two different types: 1) color or black/white pigments and 2) flake-type pigments.

The color/black/white pigments of the first layer 111 are described by volume scattering particles. Color/black/white pigments of the first layer 111 can be described by volume scattering particles obeying Mie scattering or other user-defined scattering properties that can be obtained e.g. from prior wave-optical simulations. The flake-type pigments 114 of the second layer 112, such as aluminums, micas etc., are modelled by geometrical surfaces of various geometries that are immersed into a base coat, both together forming the second layer 112. Interface properties of these immersed surfaces are set to desired spectral optical properties of the flake-type pigments, e.g. thin-film interference, mirrors of different smoothness, specific bi-directional scatter distributions. Further, the flake-type pigments of the second layer 112 are additionally set to specific lateral/longitudinal alignment, thickness and/or optical property distributions, e.g. varying film-thickness distribution. The immersed flake-type pigments of the second layer 112 are illustrated as dark shadows 114 and are here floating in the upper region of the second layer 112.

Figure 3:
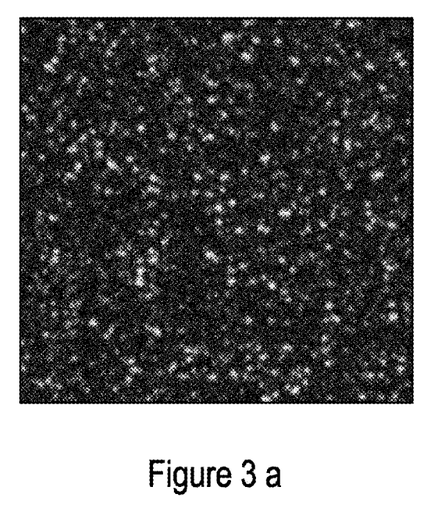
FIG. 3a shows an example of an image of a coating based on measured optical values.
FIG. 3b shows an example of an image of a virtually created and illuminated coating obtained by another embodiment of the proposed method.

FIG. 2 shows an angled view from above at an example of a virtually created target coating 200 which is virtually illuminated by a diffuse light source 220 according to a further embodiment of the proposed method. The diffuse light source 220 is illustrated, i.e. modelled as a semi-transparent half sphere. The coating 200 is applied on top of a substrate 210 and is penetrated by light rays originating from the light source 220. Receivers 230 which are virtually positioned close above a surface of the coating 200 collect light rays after the light rays have interacted with the coating 200. The receivers 230 determine at least one of an angular distribution, a spectral distribution and a spatial distribution of intensity of the light rays re-emitted from or reflected by the coating 200. For texture analysis, the angular and spatial distribution of intensity of the light rays is evaluated and a gray-scale image is obtained. One exemplary image is shown in FIG. 3b. Alternatively, information for texture analysis can also be received in a spectrally resolved manner, e.g. to obtain a color image or, more generally, to obtain spectral information about the spatial reflectance of the coating 200.

The arrows 201 and 202 which are perpendicular to each other indicate a coordinate system wherein arrow 201 is oriented parallel to the surface of the coating 200 and arrow 202 is oriented perpendicular to the surface of the coating 200, i. e. in the deepness of the coating 200.

It is advantageous to choose virtual pixel sizes of the images to obtain (micrometer-) μm-scale resolution. This ensures that individual flake-type pigments can be identified and contrast from the background. For much larger pixels, effects in remission from flakes and background are averaged and texture cannot be detected. Much smaller pixels increase computationally effort and required number of traced rays to obtain images with acceptably low noise levels.

Such high resolution allows to distinguish bright spots caused by flake-like pigments and a darker background unambiguously.

The simulated image as shown in FIG. 3b can be, similarly to a measured image of a real coating, post-processed by different methods known in the art to deduce texture features.

FIG. 3a shows an example of a measured image of a real coating. FIG. 3b shows an example of a simulated image of a simulated coating as obtained by an embodiment of the proposed method. Both images can be post-proposed in the same manner, i.e. by the same methods, to deduce texture features.

Figure 4:
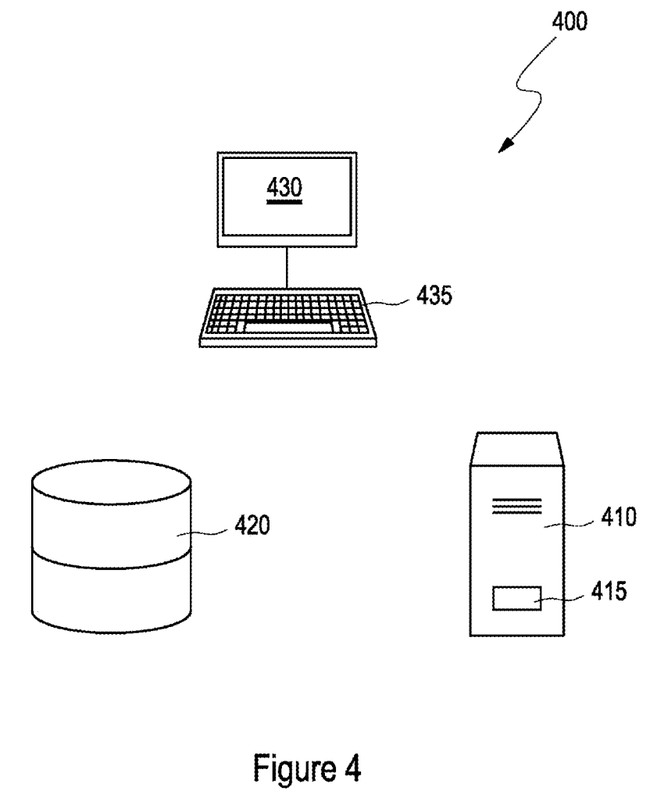
FIG. 4 schematically illustrates an embodiment of the proposed system.

FIG. 4 schematically illustrates an embodiment of the proposed system. The system 400 is configured to simulate texture features of a n-layer target coating, each layer of the n-layer target coating having known real geometrical properties and being composed of known individual ingredients with known real material properties. Examples of such a n-layer target coating are shown in FIGS. 1 and 2. The system 400 comprises a computing device 410. The system 400 further comprises a computer program product which comprises computer executable codes stored on a computer readable storage medium. In the example shown here, the computer readable storage medium 415 is loaded in an internal memory of the computing device 410. Thus, the computer readable storage medium 415 is functionally coupled to the computing device 410. Any other functional coupling of the computer readable storage medium 415 and the computing device 410 is possible. The computer readable storage medium 415 causes the computing device 410 to perform a computing process when in operation, the computing process comprises the steps of:

B1) receiving, via at least one communications interface, the known real geometrical properties and the known individual ingredients with the known real material properties, B2) modelling the n-layer target coating in a virtual environment, wherein each layer of the n-layer target coating is created according to its real geometrical and material properties, B3) virtually tracing rays of light from one or more virtual light sources towards an aim region defined on a surface of the n-layer target coating for simulating an interaction of incident light rays from the one or more virtual light sources and the n-layer target coating, B4) virtually collecting rays of light that interacted with the n-layer target coating, B5) virtually determining at least one of an angular, a spectral and a spatial distribution of intensity of the rays of light re-emitted from or reflected by the n-layer target coating, B6) evaluating the determined distribution(s) of intensity and outputting, via an output device 430, at least one image based on the evaluation.

In the example shown here, the proposed system 400 also comprises a color database 420 comprising individual ingredients with their material properties and formulations for coating compositions and interrelated colorimetric data. The computing device 410 is functionally coupled to the color database 420 and can retrieve the known real geometrical properties and the known individual ingredients with the known real material properties from the color database 420. The computing device 410 further comprises (or is at least functionally coupled to) an input device 435 and the output device 430. The input device 435 can be a touch screen, an audio input, a movement input, a mouse, a keypad input and/or the like. The output device 430 can be an audio output, a video output, a screen/display output, and/or the like.

LIST OF REFERENCE SIGNS 100 target coating
110 substrate
111 first layer
112 second layer
113 third layer
114 flake-type pigments
116 layer-layer interface
117 layer-layer interface
200 target coating
201, 202 arrows indicating a coordinate system
210 substrate
220 light source
230 receiver
400 system
410 computing device
415 computer readable storage medium
420 color database
430 output device
435 input device

The invention claimed is:

1. A computer-implemented method for simulating texture features of a n-layer target coating, each layer of the n-layer target coating having known real geometrical properties and being composed of known individual ingredients with known real material properties, the method comprising at least the steps of:

a) providing, via at least one communications interface, the known real geometrical properties and the known individual ingredients with the known real material properties,
b) modelling, by at least one processor, the n-layer target coating in a virtual environment, wherein each layer of the n-layer target coating is created according to its real geometrical and material properties;
c) virtually tracing, by at least one of the at least one processor, rays of light from one or more virtual light sources towards an aim region defined on a surface of the n-layer target coating for simulating an interaction of incident light rays from the one or more virtual light sources and the n-layer target coating;
d) virtually collecting, by one or more receivers, rays of light that interacted with the n-layer target coating;
e) virtually determining, by the one or more receivers, at least one of an angular, a spectral and a spatial distribution of intensity of the rays of light re-emitted from or reflected by the n-layer target coating, and
f) evaluating, by at least one of the at least one processor, the determined distribution(s) of intensity and outputting, by an output device, at least one image based on the evaluation, wherein virtual pixel sizes of the at least one image are chosen to obtain µm-scale resolution.

2. The method according to claim 1, wherein in the modelling step, regarding the geometrical properties, modelling of the n-layer target coating in the lateral dimensions is restricted to a region interacting with the incident light rays in step c).

3. The method according to claim 1, wherein in the modelling step, regarding the geometrical properties, modelling of the n-layer target coating in the longitudinal dimension is modelled with an exact value given by the known real geometrical properties.

4. The method according to claim 1, wherein in the modelling step, regarding the material properties, the layer ingredients are described by their respective complex refractive index.

5. The method according to claim 1, wherein the modelling step comprises modelling pigments of at least one of color/black/white pigment type and flake pigment type, wherein the color/black/white pigments are described by volume scattering particles and the flake-type pigments are modelled by geometrical components of various geometries that are immersed into a specific layer and interface properties of these immersed components are set to desired spectral optical properties of the flake-type pigments.

6. The method according to claim 5, wherein the modelling step comprises flake-type pigments additionally being set to specific lateral and/or longitudinal alignment, thickness and/or optical property distributions.

7. The method according to claim 1, wherein the ray-tracing step comprises modelling the rays as obeying pre-given spectral, angular and/or spatial distributions.

8. The method according to claim 1, wherein in step e) for texture analysis, the angular and spatial distribution of intensity is evaluated and at least one gray-scale image is obtained.

9. The method according to claim 1, wherein in step e) for texture analysis, spectral distribution of intensity of the light rays is determined and at least one colored image is obtained.

10. The method according to claim 1, further comprising the step of post-processing the at least one image by means of a known post-processing method to deduce the texture features.

11. A system for simulating texture features of a n-layer target coating, each layer of the n-layer target coating having known real geometrical properties and being composed of known individual ingredients with known real material properties, the system comprising:
A) at least one computing device;
B) a computer program product, the computer program product comprises computer executable codes stored on a computer readable storage medium functionally coupled to the at least one computing device and causes the at least one computing device to perform a computing process when in operation, the computing process comprises the steps of:
B1) receiving, via at least one communications interface, the known real geometrical properties and the known individual ingredients with the known real material properties,
B2) modelling the n-layer target coating in a virtual environment, wherein each layer of the n-layer target coating is created according to its real geometrical and material properties,
B3) virtually tracing rays of light from one or more virtual light sources towards an aim region defined on a surface of the n-layer target coating for simulating an interaction of incident light rays from the one or more virtual light sources and the n-layer target coating;
B4) virtually collecting rays of light that interacted with the n-layer target coating;
B5) virtually determining at least one of an angular, a spectral and a spatial distribution of intensity of the rays of light re-emitted from or reflected by the n-layer target coating; and
B6) evaluating the determined distribution(s) of intensity and outputting, via an output device, at least one image based on the evaluation, wherein virtual pixel sizes of the at least one image are chosen to obtain µm-scale resolution.

12. The system according to claim 11, further comprising:
C) a color database comprising individual ingredients with their material properties and formulations for coating compositions and interrelated colorimetric data;
wherein the computing device is functionally coupled to the color database, the computing device further comprising an input device and the output device.

13. A computer program product for simulating texture features of a n-layer target coating, each layer of the n-layer target coating having known real geometrical properties and being composed of known individual ingredients with known real material properties, the computer program product comprises computer executable codes stored on a non-transitory computer-readable storage medium functionally coupled to at least one computing device and causes the at least one computing device to perform a computing process when in operation, the computing process comprises the steps of:
1) Receiving, via at least one communications interface, the known real geometrical properties and the known individual ingredients with the known real material properties,
2) Modelling the n-layer target coating in a virtual environment, wherein each layer of the n-layer target coating is created according to its real geometrical and material properties,
3) Virtually tracing rays of light from one or more virtual light sources towards an aim region defined on a surface of the n-layer target coating for simulating an interaction of incident light rays from the one or more virtual light sources and the n-layer target coating, 4) Virtually collecting rays of light that interacted with the n-layer target coating, 5) Virtually determining at least one of an angular, a spectral and a spatial distribution of intensity of the rays of light re-emitted from or reflected by the n-layer target coating, and 6) Evaluating the determined distribution(s) of intensity and outputting, via an output device, at least one image based on the evaluation, wherein virtual pixel sizes of the at least one image are chosen to obtain μm-scale resolution.

14. A non-transitory computer-readable medium for simulating texture features of a n-layer target coating, each layer of the n-layer target coating having known real geometrical properties and being composed of known individual ingredients with known real material properties, the computer-readable medium storing instructions that when executed by one or more processors, cause a machine to:

1) Receive, via at least one communications interface, the known real geometrical properties and the known individual ingredients with the known real material properties, 2) Model the n-layer target coating in a virtual environment, wherein each layer of the n-layer target coating is created according to its real geometrical and material properties, 3) Virtually trace rays of light from one or more virtual light sources towards an aim region defined on a surface of the n-layer target coating for simulating an interaction of incident light rays from the one or more virtual light sources and the n-layer target coating, 4) Virtually collect rays of light that interacted with the n-layer target coating, 5) Virtually determine at least one of an angular, a spectral and a spatial distribution of intensity of the rays of light re-emitted from or reflected by the n-layer target coating, and 6) Evaluate the determined distribution(s) of intensity and outputting, via an output device, at least one image based on the evaluation, wherein virtual pixel sizes of the at least one image are chosen to obtain μm-scale resolution.

* * * * *